United States Patent
Proper et al.

(10) Patent No.: US 10,786,122 B2
(45) Date of Patent: Sep. 29, 2020

(54) COUNTER MOUNT FOAM DISPENSING SYSTEMS HAVING IMPROVED FOAM QUALITY

(71) Applicant: GOJO Industries, Inc., Akron, OH (US)

(72) Inventors: Scott T. Proper, Stow, OH (US); Nick E. Ciavarella, Seven Hills, OH (US); Richard E. Corney, Akron, OH (US); Mark W. Moore, Seven Hills, OH (US)

(73) Assignee: GOJO Industries, Inc., Akron, OH (US)

( * ) Notice: Subject to any disclaimer, the term of this patent is extended or adjusted under 35 U.S.C. 154(b) by 0 days.

(21) Appl. No.: 16/397,231

(22) Filed: Apr. 29, 2019

(65) Prior Publication Data
US 2019/0335958 A1    Nov. 7, 2019

Related U.S. Application Data

(60) Provisional application No. 62/666,131, filed on May 3, 2018.

(51) Int. Cl.
*A47K 5/14* (2006.01)
*A47K 5/06* (2006.01)
(Continued)

(52) U.S. Cl.
CPC ............... *A47K 5/14* (2013.01); *A47K 5/06* (2013.01); *B05B 7/0018* (2013.01); *F16K 15/00* (2013.01); *B05B 11/3087* (2013.01)

(58) Field of Classification Search
CPC .... A47K 5/14; A47K 5/06; A47K 2005/1218; B05B 7/0018; B05B 11/3087; B05B 11/0075; B05B 7/0037; F16K 15/00
(Continued)

(56) References Cited

U.S. PATENT DOCUMENTS 2,772,116 A    11/1956   Dobkin
9,144,351 B2 *  9/2015   Ciavarella ................ A47K 5/16
(Continued)

FOREIGN PATENT DOCUMENTS

WO    2015175772 A1    11/2015

OTHER PUBLICATIONS

International Search Report and Written Opinion of the International Searching Authority for International Appl. No. US2019/029682 dated Apr. 29, 2019, 17 pages.

*Primary Examiner* — Lien M Ngo
(74) *Attorney, Agent, or Firm* — Calfee, Halter & Griswold LLP

(57) ABSTRACT

An exemplary foam dispensing system includes a dispenser housing configured to be mounted below a counter, a spout configured to be mounted above a counter, a container supported by the dispenser housing, a pump in fluid communications with the container and configured to be mounted below a counter. The pump includes an air pump portion and a liquid pump portion. The pump also includes a mixing chamber. Liquid pumped from the liquid pump portion is mixed with air pumped from the air pump portion in the mixing chamber. A dispense tube is included that is configured to extend from the mixing chamber below a countertop to one or more mix media located above the countertop proximate an end of the spout. The one or more mix media are located near an end of the spout. An outlet nozzle is also provided and is located downstream of the one or more mix media.

20 Claims, 7 Drawing Sheets

(51) Int. Cl.
*B05B 7/00* (2006.01)
*F16K 15/00* (2006.01)
*B05B 11/00* (2006.01)

(58) Field of Classification Search
USPC .............................. 222/145.5–145.7, 190, 52
See application file for complete search history.

(56) References Cited

U.S. PATENT DOCUMENTS

| | | | |
|---|---|---|---|
| 9,579,613 B2* | 2/2017 | Fawcett | B01F 3/04992 |
| 9,687,121 B2* | 6/2017 | Ciavarella | B05B 7/0037 |
| 9,980,615 B1* | 5/2018 | Maercovich | A47K 5/1205 |
| 2013/0032614 A1* | 2/2013 | Babikian | A47K 5/06 |
| | | | 222/190 |
| 2013/0270300 A1* | 10/2013 | Ciavarella | A47K 5/1205 |
| | | | 222/190 |
| 2015/0090737 A1* | 4/2015 | Ciavarella | A47K 5/1211 |
| | | | 222/190 |
| 2015/0165392 A1 | 6/2015 | Fawcett et al. | |

* cited by examiner

COUNTER MOUNT FOAM DISPENSING SYSTEMS HAVING IMPROVED FOAM QUALITY

RELATED APPLICATIONS

This application claims priority to and the benefits of U.S. Provisional Application Ser. No. 62/666,131 titled COUNTER MOUNT FOAM DISPENSING SYSTEMS HAVING IMPROVED FOAM QUALITY, which was filed on May 3, 2018 and which is incorporated herein by reference in its entirety.

TECHNICAL FIELD

The present invention relates generally to foam dispensing systems and more particularly to counter mount foam dispensing systems having improved foam quality after periods of non-use.

BACKGROUND OF THE INVENTION

Liquid dispenser systems, such as liquid soap and sanitizer dispensers, provide a user with an amount of liquid upon actuation of the dispenser. Counter mount systems often have a foam pump located under the counter and an outlet nozzle located above the counter. Many of these systems create foam below the counter and push the foam up though a dispense tube to the outlet nozzle located at the end of a spout. FIG. 1 illustrates such an exemplary counter mount foam dispensing system 100. Dispensing system 100 includes a spout 104 mounted to a counter top 102. A pump 130 pumps liquid from a container (not shown) up through dip tube 120, mixes the fluid with air, forces the mixture through foaming cartridge 150, up through dispensing tube 122 and out of outlet 125.

After dispensing a dose of foam, residual foam remains in dispensing tube 122. If the dispenser remains idle for a period of time, such as, for example, 15 minutes, the foam in dispensing tube 122 breaks down forming a liquid pool 160 at the bottom of the dispensing tube 122. Upon the next actuation, the pump 130 pumps a liquid air mixture through foam cartridge 150 where it is converted into a foam. The foam flows into the liquid pool 160 and pushes the air above the liquid out of the foam outlet 125 causing a dry shot which is undesirable. In addition, after a couple of activations, the foam and liquid mixture are forced up and out of the outlet 125. Due to the excess liquid, the foam/liquid mixture provides a low quality wet foam shot, which is also undesirable.

SUMMARY

Exemplary foam dispensing systems are disclosed herein. An exemplary foam dispensing system includes a dispenser housing configured to be mounted below a counter, a spout configured to be mounted above a counter, a container supported by the dispenser housing, a pump in fluid communications with the container and configured to be mounted below a counter. The pump includes an air pump portion and a liquid pump portion. The pump also includes a mixing chamber. Liquid pumped from the liquid pump portion is mixed with air pumped from the air pump portion in the mixing chamber. A dispense tube is included that is configured to extend from the mixing chamber below a countertop to one or more mix media located above the countertop proximate an end of the spout. The one or more mix media are located near an end of the spout. An outlet nozzle is also provided and is located downstream of the one or more mix media.

Another exemplary foam dispensing system includes a dispenser housing configured to be mounted below a counter, a spout configured to be mounted above a counter, a container supported by the housing, a pump in fluid communications with the container, a dispense tube extending from the pump to an end of the spout, one or more mix media located at the end of the dispense tube near an end of the spout, an outlet nozzle is downstream of the one or more mix media and a one-way check valve is located in the dispense tube flow path between the pump and the outlet nozzle.

Another exemplary foam dispensing system includes a dispenser housing configured to be mounted below a counter, a spout configured to be mounted above a counter, a container supported by the housing, a pump in fluid communications with the container, a dispense tube extending from the pump to an end of the spout, one or more mix media located at the end of the dispense tube near an end of the spout, an outlet nozzle downstream of the one or more mix media, and a one-way check valve located in the dispense tube flow path between the pump and the outlet nozzle.

In this way, a simple and economical foam dispensing system that has the ability to dispense high quality foam after periods of non-use.

BRIEF DESCRIPTION OF THE DRAWINGS

These and other features and advantages of the present invention will become better understood with regard to the following description and accompanying drawings in which.

DETAILED DESCRIPTION

Figure 1:
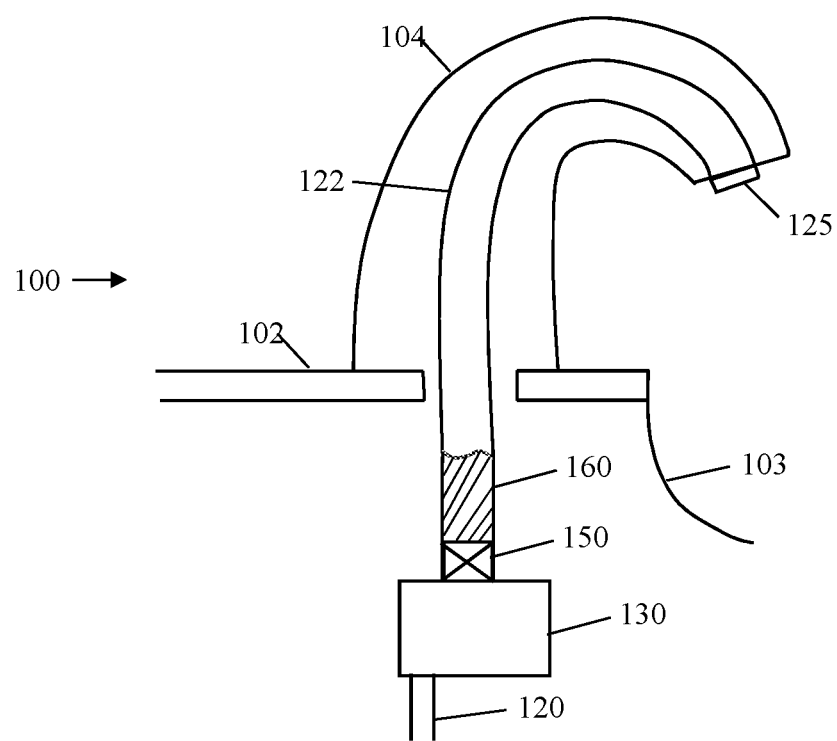
FIG. 1 is a partial schematic view of a prior art foam dispensing system.
Figure 2:
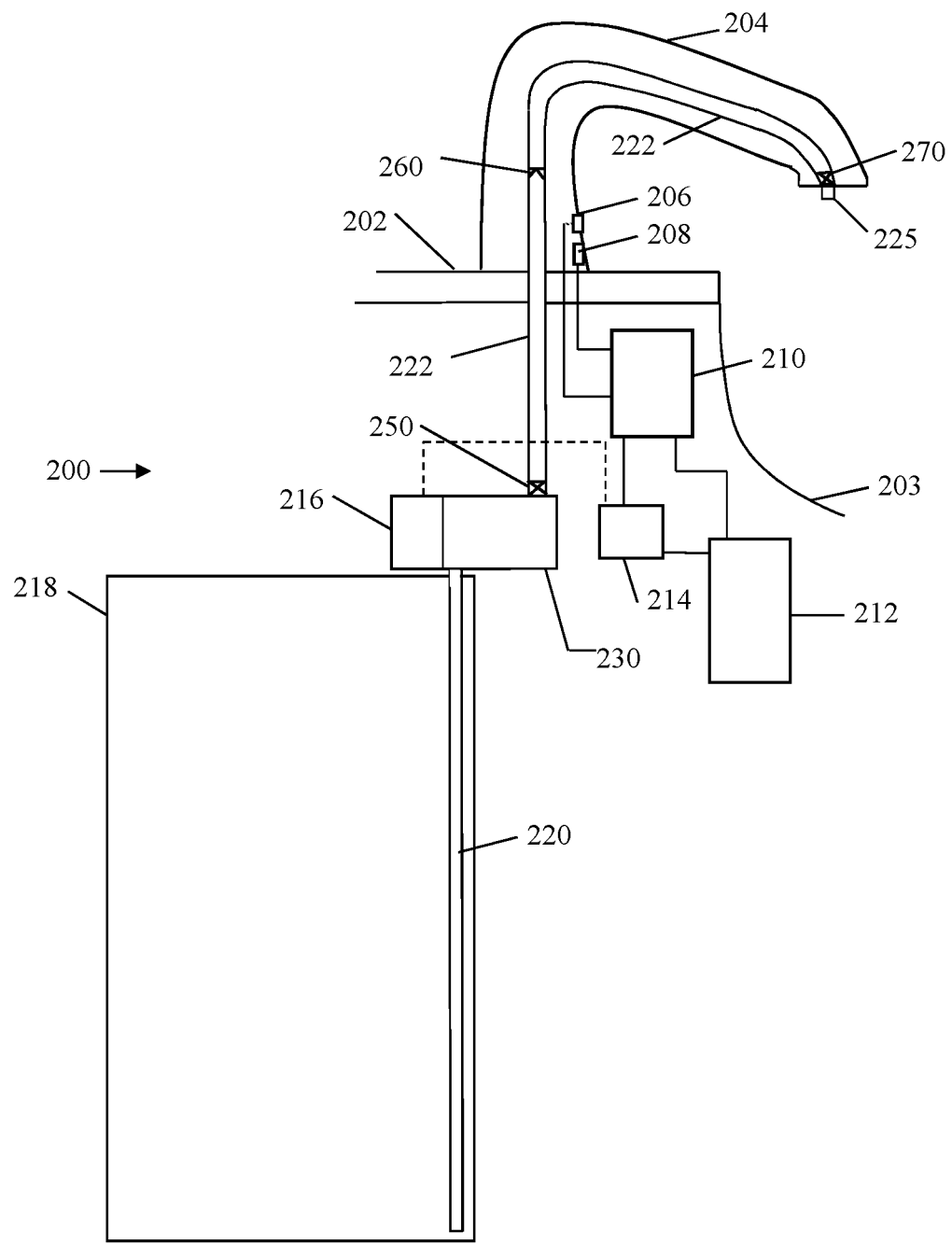
FIG. 2 is a schematic view of an exemplary embodiment of a foam dispensing system.

FIG. 2 is a schematic view of an exemplary embodiment of a foam-at-a-distance dispenser system 200. Foam dispensing system 200 includes a spout 204, which is mounted to a countertop 102. Spout 204 includes an object sensor 206, such as, for example, an infrared sensor, a motion sensor, a capacitance sensor or the like. Sensor 206 is in circuit communication with controller 210. Controller 210 may include a processor, a microprocessor or the like. Controller 210 also includes memory and/or circuitry that is necessary to perform the specific functions described herein and general functions of a dispensing system.

In addition, in some embodiments, spout 204 includes feedback indicator 208. Feedback indicator 208 may provide a visual and/or an audible feedback to a user. Exemplary visual feedback indicators may be, for example, one or more light emitting diodes (LEDs). Feedback indicator 208 may be used to inform a user of the status of the dispenser, such as, for example, a green light indicating that the dispenser is functioning properly, or a red light indicating a problem with the dispenser, such as, for example, "out of soap" or "out of order". Controller 210 is in circuit communication with sensor 206, indicator 208 and pump actuator 214. Pump actuator 214 may include, for example, a motor that rotates and one or more gears, or gear trains, that may be used to actuate dispenser pump 216. The term "pump" is used throughout the specification and often refers to a liquid pump portion and an air pump portion. It should be understood that the term pump includes pumps. Therefore the term "pump" should be construed to cover both a single pump that pumps air and liquid as well as two or more pumps that pump air and liquid. In addition, as can be seen more clearly in FIG. 3, foam dispensing system 200 includes a one-way check valve 260 located within dispense tube 222 and a foaming cartridge 270 located between the end of dispense tube 222 and the outlet 225.

While the one-way check valves and foaming cartridges may be identified as being located "within" the dispense tubes, the one-way check valves and foaming cartridges need only be located within the fluid flow path of the dispense tube, and are not necessarily inside of the dispense tube itself. Indeed, in many applications, the dispense tube consist of multiple tubes connected to one another by the of the one-way check valve(s) and/or foaming cartridges to form the overall dispense tube.

The foaming cartridges disclosed herein include a first screen and a second screen separated by a mixing area. In some embodiments, foaming cartridge is synonymous with mix media. Mix media may be one or more screens, one or more porous member, one or more baffles, combinations thereof, or the like and may have one or more spaces therebetween. Accordingly, while the embodiments are described as having one or more foaming cartridges, unless otherwise noted, it should be understood that the embodiments may have one or more mix media rather than a foaming cartridge.

"Circuit communication" indicates a communicative relationship between devices. Direct electrical, electromagnetic and optical connections and indirect electrical, electromagnetic and optical connections are examples of circuit communication. Two devices are in circuit communication if a signal from one is received by the other, regardless of whether the signal is modified by some other device. For example, two devices separated by one or more of the following—amplifiers, filters, transformers, optoisolators, digital or analog buffers, analog integrators, other electronic circuitry, fiber optic transceivers or satellites—are in circuit communication if a signal from one is communicated to the other, even though the signal is modified by the intermediate device(s). As another example, an electromagnetic sensor is in circuit communication with a signal if it receives electromagnetic radiation from the signal. As a final example, two devices not directly connected to each other, but both capable of interfacing with a third device, such as, for example, a CPU, are in circuit communication.

A power source 212 provides power to the controller 210, pump actuator 214 and other components that require power. Power supply 212 may be one or more batteries, a hard-wired power source drawing power from, for example, a 120 VAC line, a solar panel, combinations thereof or the like. Power supply 212 may include any necessary transformers, rectifiers, or power conditioning components needed to obtain suitable power for the components described herein.

In this exemplary embodiment, pump actuator 214 actuates motor 216 which drives pump 230 that pumps liquid and air through foaming cartridge 250, past one-way check valve 260, through foaming cartridge 270 and out of outlet 225. As described above, the term foaming cartridge 250, may be for example, one or more screens, baffles, sponges or other porous members that cause turbulent flow and hence enhance mixing of liquid and air. The pumps disclosed herein are foam pumps and may be separate air and liquid pumps or may be a single pump that separately pumps both liquid and air. The pumps generally include a mixing chamber (not shown) where air and liquid are mixed to form a liquid/air mixture. The term mixing chamber as used herein, is an area that where the liquid and air mix with one another. Pump(s) 230 is connected to liquid inlet dip tube 220, which is in container 218, and liquid dispense tube 222.

In some embodiments, two or more of the container, pump, dip tube, dispenser tube and mix media may form a refill and may be replaced when the container runs out of fluid or stops working. The containers generally container a fluid, such as, for example, a foamable soap, sanitizer, or lotion.

Controller 210 includes logic or circuitry for operating pump actuator 214 that operates pump(s) 230 and the other electronic components identified above as required. "Logic" is synonymous with "circuit" or "circuitry" and includes, but is not limited to hardware, firmware, software and/or combinations of each to perform a function(s) or an action(s). For example, based on a desired application or needs, logic may include a software controlled microprocessor or microcontroller, discrete logic, such as an application specific integrated circuit (ASIC) or other programmed logic device. Logic may also be fully embodied as software. The circuits identified and described herein may have many different configurations to perform the desired functions.

Figure 3:
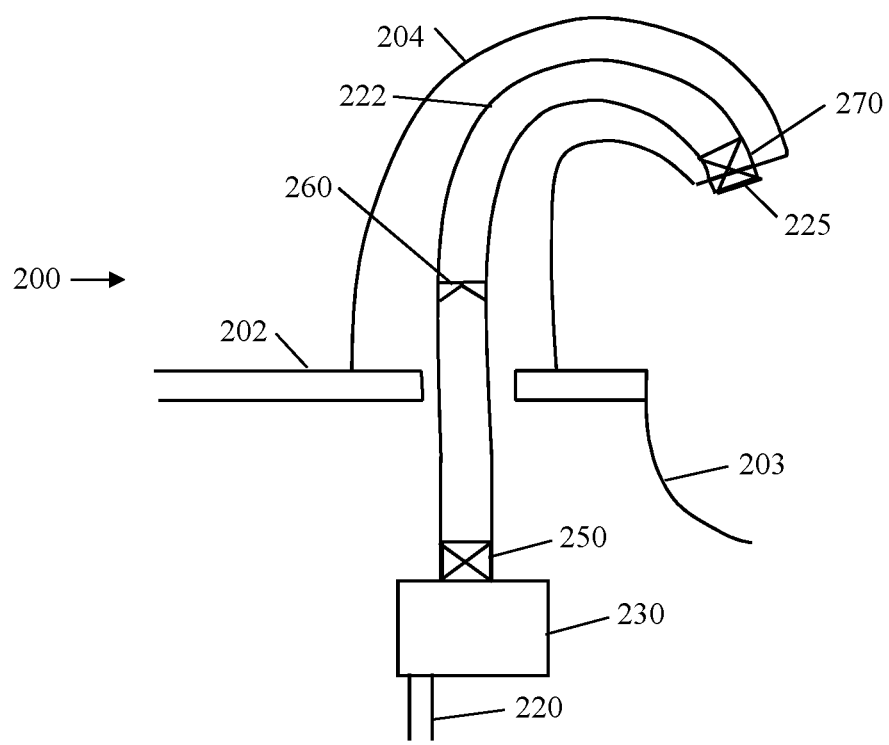
FIG. 3 is an enlarged schematic view of a portion of the exemplary foam dispensing system of FIG. 2.
Figure 4:
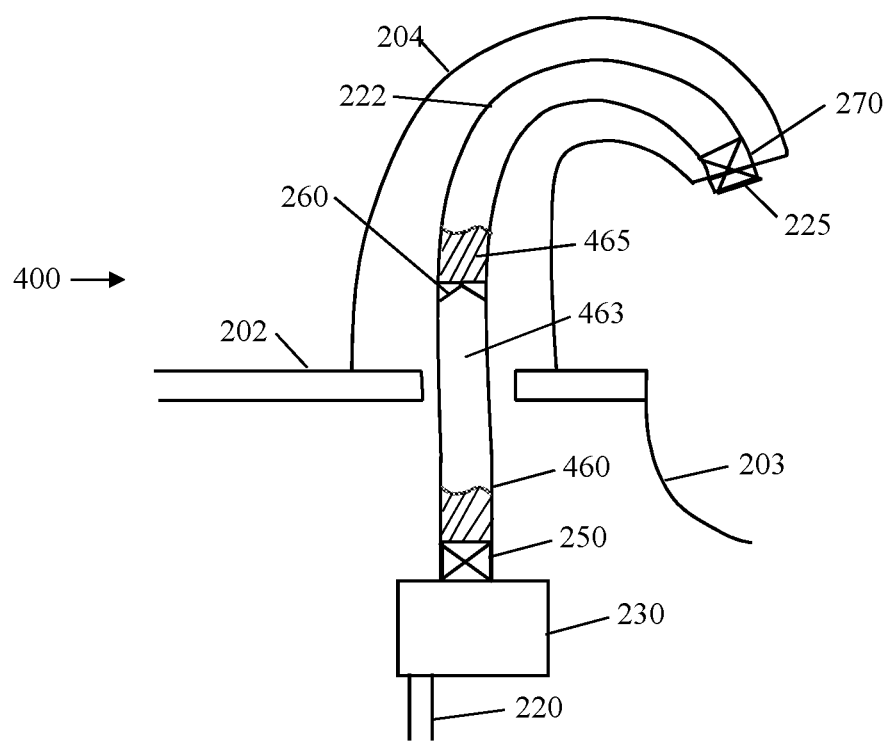
FIG. 4 is the enlarged schematic view of FIG. 3 illustrating the system after foam in the dispensing tube has broken down into residual liquid.

FIG. 3 is an enlarged schematic view of a portion of the exemplary foam dispensing system of FIG. 2. FIG. 4 illustrates the exemplary foam dispensing system 400 at a time after the foam has broken down and pooled as a liquid on top of the foaming cartridge 250 and the check valve 260. Upon actuation, pump 230 draws liquid up through dip tube 220 and mixes it with air. The liquid/air mixture is forced through foaming cartridge 250 and up into dispense tube 222. The foam mixes with a small pool of liquid 460 and pushes air that is in portion 463 through liquid 465. This mixture is forced up through foaming cartridge 270 and out of nozzle 225.

In some embodiment, check valve 260 essentially shortens the effective length of dispense tube 222 so that even after a period of non-use, only a small volume of dry air is dispensed out of nozzle 225. In addition, the air trapped in section 463 mixes with the liquid 465 and the smaller volume of liquid 460 mixes with foam flowing from the foaming cartridge rendering the foam output a more consistent and higher quality foam and substantially eliminates an overly wet foam from being dispensed.

Figure 5:
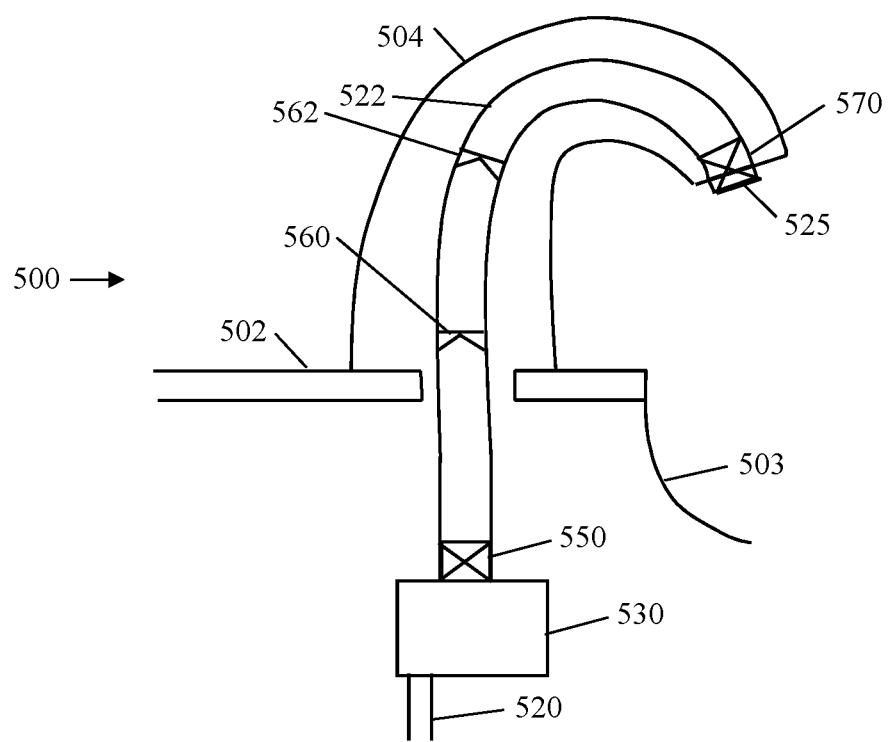
FIG. 5 is an enlarged schematic view of a portion of another exemplary foam dispensing system.

FIG. 5 is an enlarged schematic view of a portion of another exemplary foam dispensing system 500. Foam dispensing system 500 is similar to the foam dispensing system 200. Foam dispensing system 500 includes a spout 504 located above a counter 502, a pump 530 located below the counter, a dip tube 520, an optional first foaming cartridge 550, a dispense tube 522, a second foaming cartridge 570 and an outlet 525. In addition, located within the flow path of dispensing tube 522 is a first check valve 560 and a second check valve 532. In some embodiments, more than two check valves are located in dispensing tube 522 flow path. The use of multiple check valves in the dispense tube 522 may result in multiple pools of liquid within the dispense tube along with multiple pockets of air located therebetween. Accordingly, during subsequent operations of the pump 530 after foam has broken down and separated into liquid and air, the foam, trapped air pockets and pooled liquid pockets mix and flow out of the nozzle as a more consistent and higher quality foam.

Figure 6:
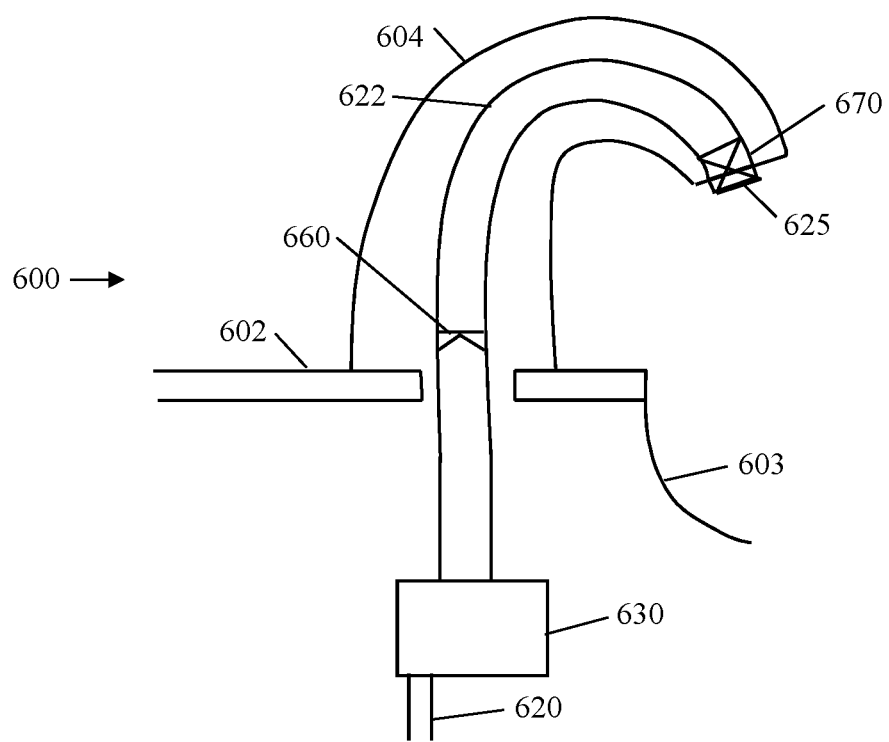
FIG. 6 is an enlarged schematic view of a portion of yet another exemplary foam dispensing system.

FIG. 6 is an enlarged schematic view of a portion of yet another exemplary foam dispensing system 600. Foam dispensing system 600 is similar to the foam dispensing system 200. Foam dispensing system 600 includes a spout 604 located above a counter top 602, a pump 630 located below the counter top 502, a dip tube 620 extending into a container (not shown), a dispense tube 522 extending from the pump to a foaming cartridge 670, a check valve 660 located in the dispense tube 522 flow path and an outlet 625.

Operation is similar to the operations disclosed above. Pump 630 pumps a mixture of liquid and air up dispensing tube 622. Air below check valve 660 flows up into liquid pooled above check valve 660 and the liquid air mixtures flow up dispense tube 622 through foaming cartridge 670 and out of outlet 625 as more consistent and higher quality foam.

Figure 7:
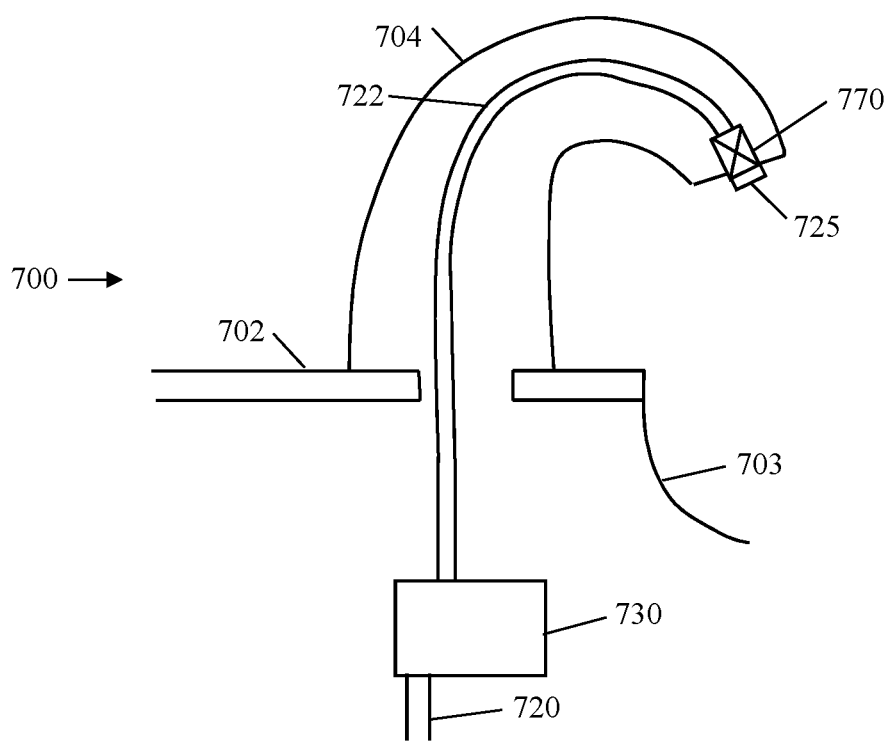
FIG. 7 is an enlarged schematic view of a portion of still another exemplary foam dispensing system.

FIG. 7 is an enlarged schematic view of a portion of yet another exemplary foam dispensing system 700. Foam dispensing system 700 includes a spout 704 located above a counter 702, a pump 730 and a dip tube 720 located below the counter, a foaming cartridge 770 and an outlet 725 located above the counter and a dispense tube 722 extending from the pump 730 to the foaming cartridge 770. Foam dispensing system 700 may include additional components, such as, for example, those shown and described with respect to FIG. 2.

During operation, pump 730 pumps a mixture of liquid and air up dispensing tube 722 and the mixture flows through foaming cartridge 670 where it is mixed to a high-quality foam is dispensed out of outlet 725.

In some embodiments, the diameter of dispensing tube 722 should be considered. In some embodiments, dispensing tube 722 has a diameter that is sized so that the liquid/air mixture that is being pumped through dispensing tube 722 does not separate resulting in the liquid settling at the bottom of the tube. In some embodiments, the diameter of the dispensing tube is less than 3/16 of inch. In some embodiments, the diameter of the dispensing tube is about 1/8 of an inch. In some embodiments, the diameter of the dispensing tube is less than about 1/8 of an inch.

In some embodiments, the diameter of the dispensing tube is selected so that the volume of the area within the dispense tube is less than about the volume of the liquid and air pump pumped in a cycle. In some embodiments, the diameter of the dispensing tube is selected so that the volume of the area within the dispense tube is less than about 75% of the volume of the liquid and air pump pumped in a cycle. In some embodiments, the diameter of the dispensing tube is selected so that the volume of the area within the dispense tube is less than about 50% of the volume of the liquid and air pump pumped in a cycle. In some embodiments, the diameter of the dispensing tube is selected so that the volume of the area within the dispense tube is less than about 30% of the volume of the liquid and air pump pumped in a cycle.

While the present invention has been illustrated by the description of embodiments thereof and while the embodiments have been described in considerable detail, it is not the intention of the applicant to restrict or in any way limit the scope of the appended claims to such detail. Additional advantages and modifications will readily appear to those skilled in the art. Therefore, the invention, in its broader aspects, is not limited to the specific details, the representative apparatus and illustrative examples shown and described. Accordingly, departures may be made from such details without departing from the spirit or scope of the applicant's general inventive concept.

We claim:

1. A foam dispensing system comprising:
   a dispenser housing configured to be mounted below a counter;
   a spout configured to be mounted above a counter;
   a container supported by the housing;
   a pump in fluid communications with the container and configured to be mounted below a counter;
   the pump having an air pump portion and a liquid pump portion;
   the pump having a mixing area wherein liquid pumped from the liquid pump portion is mixed with air pumped from the air pump portion;
   one or more first mix media located proximate the mixing area
   a dispense tube configured to extend from the one or more first mixing media below a countertop to one or more second mix media located above the counter proximate an end of the spout;
   an outlet nozzle downstream of the one or more second mix media; and
   a one-way check valve located in the dispense tube flow path between the one or more first mix media and the one or more second mix media.

2. The foam dispensing system of claim 1 wherein the diameter of the dispense tube is less than 3/16 of an inch.

3. The foam dispensing system of claim 1 wherein the diameter of the dispense tube is about 1/8 of an inch.

4. The foam dispensing system of claim 1 further comprising a check valve located between the mixing area and the second mix media.

5. The foam dispensing system of claim 1 wherein the volume of the dispense tube is less than about 50% of the volume of the liquid pump and the air pump.

6. The foam dispensing system of claim 1 wherein one or both of the first mix media and the second mix media comprises a first screen and a second screen separated by a mixing region located therebetween.

7. A foam dispensing system comprising:
   a dispenser housing configured to be mounted below a counter;
   a spout configured to be mounted above a counter;
   a container supported by the housing;
   a pump in fluid communications with the container:
   one or more first mix media located proximate the pump;
   a dispense tube extending from the one or more mix media proximate the pump to an end of the spout;
   one or more second mix media located at the end of the dispense tube proximate an end of the spout;
   an outlet nozzle downstream of the one or more second mix media; and
   a one-way check valve located in the dispense tube flow path between the one or more first mix media and the one or more second mix media.

8. The foam dispensing system of claim 7 wherein the one-way check valve is located above a counter top when the foam dispensing system is installed.

9. The foam dispensing system of claim 7 wherein the one-way check valve connects a first part of the dispense tube to a second part of the dispense tube.

10. The foam dispensing system of claim 7 further comprising one or more mix media located near the end of the dispense tube proximate the pump.

11. The foam dispensing system of claim 7 wherein the dispense tube comprises a first section extending from near the pump to the one-way check valve and a second section extending from the one-way check valve to the one or more mix media.

12. The foam dispensing system of claim 7 wherein the first mix media comprises a first screen and a second screen with mixing area located therebetween.

13. The foam dispensing system of claim 7 further comprising a second one-way check valve located in the dispense tube flow path.

14. An under counter mount foam dispensing system comprising:
   a dispenser housing configured to be mounted below a counter;
   a spout configured to be mounted above a counter;
   a container supported by the housing;
   a pump in fluid communications with the container:
   a dispense tube extending from the pump to an end of the spout;
   one or more first mix media located at the end of the dispense tube proximate the pump;
   one or more second mix media located at the end of the dispense tube proximate an end of the spout; and
   a one-way check valve located in the dispense tube flow path between the one or more first mix media and the one or more second mix media.

15. The foam dispensing system of claim 14 wherein the one-way check valve is located above a counter top when the foam dispensing system is installed.

16. The foam dispensing system of claim 14 wherein the one-way check valve connects a first part of the dispense tube to a second part of the dispense tube.

17. The foam dispensing system of claim 14 wherein the dispense tube has a diameter of less than about ⅛ inches.

18. The foam dispensing system of claim 14 wherein the dispense tube comprises a first section extending from near the pump to the one-way check valve and a second section extending from the one-way check valve to the one or more second mix media.

19. The foam dispensing system of claim 14 wherein the one or more second mix media comprises a first screen and a second screen with mixing area located therebetween.

20. The foam dispensing system of claim 14 further comprising a second one-way check valve located in the dispense tube flow path.

* * * * *